United States Patent
Zeng et al.

(10) Patent No.: US 9,974,131 B2
(45) Date of Patent: May 15, 2018

(54) LIGHT-EMITTING COMPONENT FOR BACKLIGHT MODULE HAVING A PLURALITY OF BRANCHES CONNECTED IN PARALLEL BETWEEN A FIRST POSITIVE INPUT END AND A FIRST NEGATIVE INPUT END, AND BACKLIGHT MODULE AND LIQUID CRYSTAL DISPLAY DEVICE CONTAINING THE SAME

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Zhihui Zeng, Beijing (CN); Lingyun Shi, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 140 days.

(21) Appl. No.: 14/499,694

(22) Filed: Sep. 29, 2014

(65) Prior Publication Data

US 2015/0237687 A1 Aug. 20, 2015

(30) Foreign Application Priority Data

Feb. 19, 2014 (CN) .......................... 2014 1 0056951

(51) Int. Cl.
*H05B 33/00* (2006.01)
*H05B 33/08* (2006.01)
*G02F 1/1335* (2006.01)

(52) U.S. Cl.
CPC ...... *H05B 33/083* (2013.01); *G02F 1/133603* (2013.01); *H05B 33/0827* (2013.01);
(Continued)

(58) Field of Classification Search
CPC .............. H05B 33/0833; H05B 33/083; H05B 33/0827; G02F 1/133603
(Continued)

(56) References Cited

U.S. PATENT DOCUMENTS

| 2013/0342118 A1* | 12/2013 | Zhang | ............... H05B 33/0827 315/192 |
| 2014/0266997 A1* | 9/2014 | Hu | ........................... G09G 3/36 345/102 |
| 2014/0346954 A1* | 11/2014 | Li | ...................... H05B 33/0809 315/121 |

FOREIGN PATENT DOCUMENTS

| CN | 101438629 A | 5/2009 |
| CN | 201758474 U | 3/2011 |

(Continued)

OTHER PUBLICATIONS

2nd Office Action issued in Chinese application No. 201410056951.0 dated Jan. 15, 2016.
(Continued)

*Primary Examiner* — Sean Gramling
*Assistant Examiner* — Gerald J Sufleta, II
(74) *Attorney, Agent, or Firm* — Nath, Goldberg & Meyer; Joshua B. Goldberg

(57) ABSTRACT

The present invention provides a light-emitting component for a backlight module, which comprises a first positive input end, a first negative input end and a plurality of branches connected in parallel therebetween, each of the plurality of the branches comprising a plurality of LEDs connected in series, wherein, in the case that the numbers of
(Continued)

LEDs in the respective branches are not exactly the same, a voltage divider is connected in series in at least one of the branches so that currents flowing through respective branches are the same. Correspondingly, the present invention further provides a backlight module and a liquid crystal display device. In the present invention, any number of LEDs can be provided in each of the branches in the light-emitting component, which expands the irradiation scope of light, guarantees the safe distance between adjacent LEDs, and further improves product quality.

13 Claims, 2 Drawing Sheets

(52) U.S. Cl.
CPC ............ *G02F 2001/133612* (2013.01); *H05B 33/0821* (2013.01)

(58) Field of Classification Search
USPC ............. 315/170, 185 R, 164, 298; 362/97.1
See application file for complete search history.

(56) References Cited

FOREIGN PATENT DOCUMENTS

| | | |
|---|---|---|
| CN | 103037589 A | 4/2013 |
| CN | 103348770 A | 10/2013 |
| JP | 2006147933 A * | 6/2006 |

OTHER PUBLICATIONS

Chinese Office Action dated Sep. 6, 2015 issued in corresponding Chinese Application No. 201410056951.0.

* cited by examiner

LIGHT-EMITTING COMPONENT FOR BACKLIGHT MODULE HAVING A PLURALITY OF BRANCHES CONNECTED IN PARALLEL BETWEEN A FIRST POSITIVE INPUT END AND A FIRST NEGATIVE INPUT END, AND BACKLIGHT MODULE AND LIQUID CRYSTAL DISPLAY DEVICE CONTAINING THE SAME

FIELD OF THE INVENTION

The present invention relates to the field of display technology, and particularly to a light-emitting component for a backlight module, a backlight module and a liquid crystal display device.

BACKGROUND OF THE INVENTION

In a backlight module of a liquid crystal display device, multiple light-emitting diodes (LEDs) are provided as light sources. A driving voltage for each LED ranges from 3.0V to 3.3V, and a voltage of a driving circuit for the backlight module cannot exceed 31.5V. Therefore, in the case of more than 10 LEDs, it is necessary to connect no more than 10 LEDs in series first to obtain a series branch, and then to connect the obtained series branches in parallel, but in this case, the number of the LEDs is limited. For example, in the case of 17 or 22 LEDs, as the LEDs cannot be evenly distributed in respective branches, branches with different numbers of LEDs are not allowed to be connected in parallel.

Besides, in the backlight module, the LED and the pad themselves have a certain width, and it is required to guarantee a safe distance between adjacent pads. Under this condition, for a backlight module with a fixed size, when the number of LEDs is too large, the interval between the adjacent LEDs is too small, which is likely to cause overheating problem; when the number of LEDs is less, light is insufficient, which results in dark areas in the display panel; when the number of LEDs is appropriate, branches with different numbers of LEDs are not allowed to be connected in parallel.

Consequently, how to enable any number of LEDs to be connected in series in each of the branches of the backlight module becomes an urgent technical problem in the field.

SUMMARY OF THE INVENTION

An object of the present invention is to provide a light-emitting component for a backlight module, a backlight module and a liquid crystal display device so that any number of LEDs can be connected in series in each of the branches of the backlight module.

To achieve the above object, the present invention provides a light-emitting component for a backlight module, comprising a first positive input end, a first negative input end and a plurality of branches connected in parallel between the first positive input end and the first negative input end, each of the plurality of branches comprising a plurality of LEDs connected in series, wherein, in the case that the numbers of LEDs in the respective branches are not exactly the same, a voltage divider is connected in series in at least one of the plurality of branches so that currents flowing through respective branches are the same.

Preferably, the number of LEDs connected in series in one of the plurality of branches is smaller than a preset number, the numbers of LEDs connected in series in remaining branches of the plurality of the branches are equal to the preset number, and the voltage divider is connected in series in the one branch in which the number of LEDs is smaller than the preset number.

Preferably, the number of LEDs connected in series in one of the plurality of the branches is equal to a preset number, the numbers of LEDs connected in series in remaining branches of the plurality of the branches are smaller than the preset number, and the voltage divider is connected in series in each of the remaining branches in which the numbers of LEDs are smaller than the preset number.

Preferably, the number of LEDs in each of the plurality of the branches is not larger than 10.

Preferably, the voltage divider comprises a variable resistor.

Correspondingly, the present invention further provides a backlight module, comprising a light-emitting component and a substrate on which a second positive input end and a second negative input end are provided, wherein, the light-emitting component is the above light-emitting component provided by the present invention, the second positive input end of the substrate is connected to the first positive input end of the light-emitting component, and the second negative input end of the substrate is connected to the first negative input end of the light-emitting component.

Preferably, the substrate comprises a LED section and a voltage divider section, the second positive input end, the second negative input end and the LEDs of the light-emitting component are provided in the LED section, the voltage divider of the light-emitting component is provided in the voltage divider section, and leads are provided between the voltage divider of the light-emitting component and the branch in which the voltage divider is connected in series.

Preferably, a third positive input end connected to an input end of the voltage divider of the light-emitting component and a third negative input end connected to an output end of the voltage divider of the light-emitting component are further provided in the LED section.

Preferably, the backlight module further comprises a driving unit which is connected between the light-emitting component and an external power supply and used to convert a voltage provided by the external power supply into a working voltage of the light-emitting component.

Correspondingly, the present invention further provides a liquid crystal display device comprising the above backlight module provided by the present invention.

In the present invention, in the case that the numbers of LEDs in the respective branches are not exactly the same, the voltage divider is connected in series in the branch of the light-emitting component so that the currents flowing through each of the branches are the same. In this way, any number of LEDs can be provided in each of the branches in the light-emitting component, thus guaranteeing the safe distance between the adjacent LEDs and improving product quality, while increasing the number of LEDs.

BRIEF DESCRIPTION OF THE DRAWINGS

The accompanying drawings, as a part of the discretion, are used for giving a further understanding of the present invention, and explaining the present invention together with the following specific implementations, rather than limiting the present invention. In the drawings.

REFERENCE NUMERALS

11: first positive input end; 12: first negative input end; 13: LED; 14: voltage divider; 21: second positive input end; 22: second negative input end; 23: LED section; 24: voltage divider section; 25: lead; 26: third positive input end; 27: third negative input end; 10: LED circuit; 28: connection point.

DETAILED DESCRIPTION OF THE EMBODIMENTS

The specific implementations of the present invention will be described in detail below in conjunction with the accompanying drawings. It should be understood that the specific implementations described herein are merely used for describing and explaining the present invention, rather than limiting the present invention.

Figure 1:
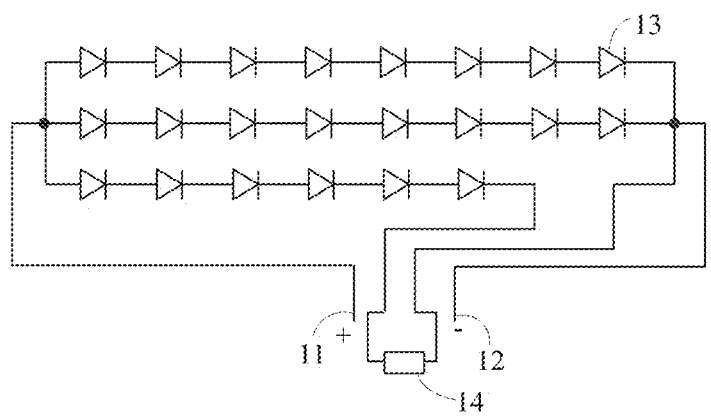
FIG. 1 is a schematic diagram of a structure of a light-emitting component provided by an implementation of the present invention.

The present invention provides a light-emitting component for a backlight module, as shown in FIG. 1, the light-emitting component comprising a positive input end 11, a negative input end 12 and a plurality of branches connected in parallel therebetween, each of the branches comprising a plurality of LEDs 13 connected in series, wherein, a voltage divider 14 is connected in series in at least one of the branches so that currents flowing though each of the branches are the same.

In the present invention, each of the branches connected in parallel comprises a plurality of LEDs connected in series, and the voltage divider 14 is connected in series in the at least one of the branches. That is, when different numbers of LEDs are connected in the plurality of branches, a voltage divider is connected in series in each of the branches with less LEDs, so that the currents flowing through the respective branches are the same. "Branch with less LEDs" refers to a branch other than the branch with the largest number of LEDs among all of the branches. For example, as shown in FIG. 1, the light-emitting component comprises twenty two LEDs 13 which are distributed in three branches, and specifically, eight LEDs 13 are connected in series in two of the branches, respectively, and six LEDs 13 are connected in series in the other branch. In this case, the voltage divider 14 is connected in series in the branch with six LEDs connected in series therein. The voltage divider 14 is provided so that in the case that different numbers of LEDs 13 are connected in the respective branches, the currents flowing through respective branches are the same, and the brightness of respective LEDs is made the same. In this way, any number of LEDs may be provided in each of the branches in the light-emitting component, thus expanding the irradiation scope of light source, guaranteeing the safe distance between the adjacent LEDs, and further improving product quality.

It can be understood that the anode of the serially-connected LEDs 13 in each of the branches is connected to the first positive input end 11, and cathode of the serially-connected LEDs 13 in each of the branches is connected to the first negative input end 12. The manner in which the voltage divider 14 is connected in series in the branch is not limited in the present invention, for example, the voltage divider 14 may be connected in series between the LEDs 13 of the branch and the first positive input end 11 (or, the first negative input end 12), or between two adjacent LEDs 13; the voltage divider 14 may be close to the LEDs connected in series thereto, or far away from the LEDs connected in series thereto, as long as a voltage dividing effect can be achieved and the currents flowing through respective branches are the same.

In the present invention, the numbers of LEDs connected in series in the respective branches may be different from each other, which is not limited. For ease of configuration, the numbers of LEDs connected in series in a part of the plurality of branches may be set the same, and the numbers of LEDs connected in series in the remaining branches are smaller or larger. When the numbers of LEDs connected in series in the remaining branches are larger, the voltage dividers 14 are connected in series in all of the branches with smaller and equal number of LEDs connected in series therein, respectively, so that the currents flowing through respective branches are the same. For example, when the light-emitting component comprises seventeen LEDs 13, five LEDs 13 may be connected in series in both a first branch and a second branch, and seven LEDs 13 may be connected in series in the third branch. In this case, the voltage divider 14 is connected in series in both the first branch and the second branch with smaller and equal number of LEDs connected in series therein. When the numbers of LEDs connected in series in the remaining branches are smaller, the voltage dividers 14 are connected in series in the branches with smaller number of LEDs, so that the currents flowing through respective branches are the same. For example, as shown in FIG. 1, when the light-emitting component comprises twenty two LEDs 13, eight LEDs 13 may be connected in series in both a first branch and a second branch, and six LEDs 13 may be connected in series in a third branch. In this case, the voltage divider 14 is connected in series in the third branch (i.e. branch with smaller number of LEDs).

It can be understood that, the number of serial branches of LEDs and the manner of serial connection among LEDs are merely for schematic illustration, but the light-emitting component may also comprise other number of branches, and other number of LEDs may be connected in series in each of the branches, as long as the currents flowing through respective branches are the same after the voltage dividers are provided, and the light-emitting component can operate under a normal working voltage.

As a specific implementation of the present invention, as shown in FIG. 1, the light-emitting component comprises 22 LEDs which are distributed in a plurality of branches. The number of LEDs 13 connected in series in one of the plurality of branches may be smaller than a preset number, the number of LEDs 13 connected in series in the remaining branches may be equal to the preset number, and the voltage dividers 14 are connected in series in the branch in which the number of LEDs is smaller than the preset number, so that the currents flowing through respective branches are the same. The preset number refers to the maximum number of LEDs allowed to be connected in series in each of the branches when the light-emitting component operates normally, such that the voltage between two ends of the branch is within the range of normal working voltage of the light-emitting component, and the distance between the adjacent LEDs 13 is within the range of safe distance in the meanwhile. In the implementation illustrated in FIG. 1, the preset number is eight.

As another implementation of the present invention, the number of LEDs 13 connected in series in one of the plurality of branches may be equal to the preset number, the number of LEDs 13 connected in series in the remaining branches may be smaller than the preset number, and the voltage dividers 14 are connected in series in the remaining branches in which the number of LEDs 13 is smaller than the preset number, so that the currents flowing through respective branches are the same. Also, taking the case that the light-emitting component comprises twenty two LEDs as an example, seven LEDs 13 may be connected in series in two of the branches, eight (the preset number) LEDs 13 may be connected in series in the other branch, and the voltage divider 14 is connected in series in each of the branches with seven LEDs 13 connected in series therein.

It can be understood that, the driving voltage for the light-emitting component is generally not larger than 31.5V, and the driving voltage for each of the LEDs 13 is in the range of 3.0-3.3V. Therefore, the number of LEDs connected in series in each of the branches which are connected in parallel cannot exceed ten, so that the light-emitting component can operate normally.

Further, to facilitate controlling the influence of a voltage divider on a branch current, the voltage divider 14 may comprise a variable resistor. The resistance of the variable resistor can be adjusted so that the total resistances of the respective branches (sum of the resistances of the plurality of LEDs 13 and the resistance of the variable resistor) are the same, and further the currents flowing through respective branches are the same.

Figure 2:
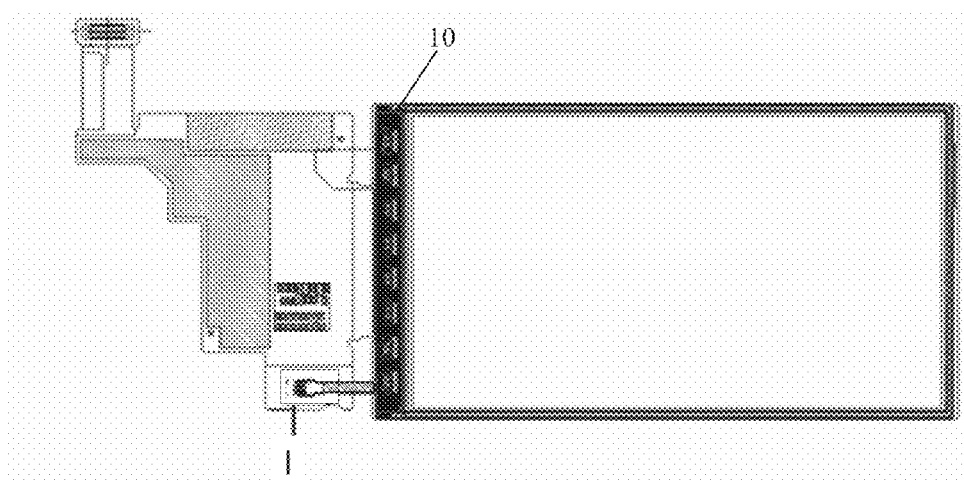
FIG. 2 is a schematic diagram of a structure of a structure of a backlight module provided by an implementation of the present invention.
Figure 3:
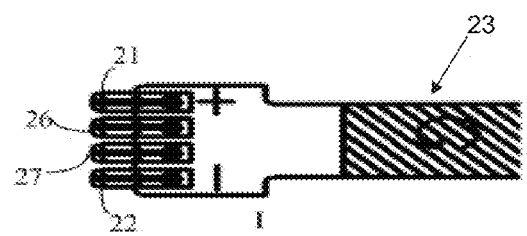
FIG. 3 is an enlarged view of part I of the backlight module in FIG. 2.

As another aspect of the present invention, a backlight module is provided, as shown in FIGS. 2 and 3, the backlight module comprising a substrate and a light-emitting component which is the above-described light-emitting component provided by the present invention. The substrate is provided with a second positive input end 21 connected to the first positive input end 11 of the light-emitting component and a second negative input end 22 connected to the first negative input end 12 of the light-emitting component. When the backlight module is operating, a voltage is applied between the second positive input end 21 and the second negative input end 22 of the substrate from an external power supply so as to drive each of the LEDs 13 of the light-emitting component to emit light.

Figure 4:
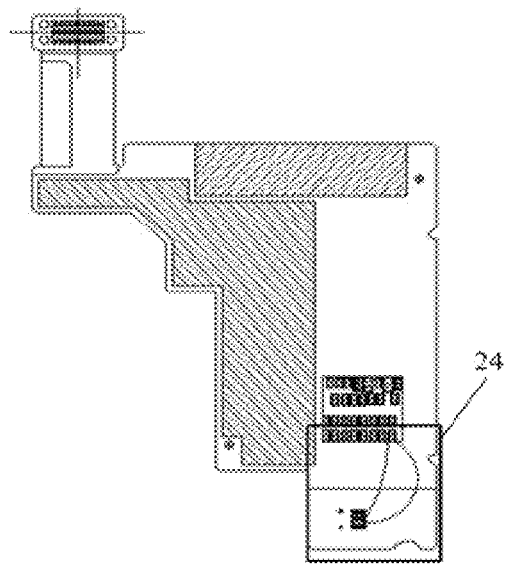
FIG. 4 is a schematic diagram of a voltage divider section in a backlight module provided by an implementation of the present invention.
Figure 5:
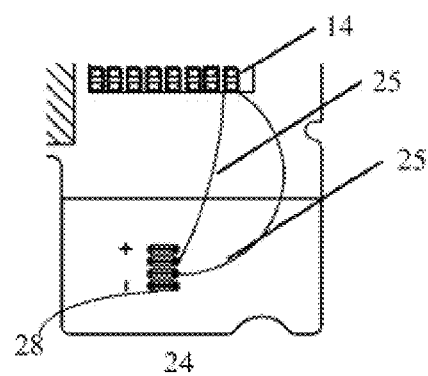
FIG. 5 is a partial enlarged view of the voltage divider section in FIG. 4.

As described above, the voltage divider 14 may be disposed either close to or away from the LEDs connected in series thereto. For ease of configuration of the LEDs and the voltage divider 14, as shown in FIGS. 3 to 5, the substrate comprises a LED section 23 and a voltage divider section 24, wherein the second positive input end 21, the second negative input end 22 and the LEDs of the light-emitting component are provided in the LED section 23, the voltage divider 14 of the light-emitting component is provided in the voltage divider section 24, and leads 25 are provided between the voltage divider 14 and the branch in which the voltage divider 14 is connected in series. It should be appreciated by those skilled in the art that the leads 25 are conductive.

Further, as shown in FIG. 3, a third positive input end 26 connected to the input end of the voltage divider 14 of the light-emitting component and a third negative input end 27 connected to the output end of the voltage divider 14 of the light-emitting component may be provided in the LED section 23, and leads 25 (not shown) are provided both between the third positive input end 26 and the branch in which the voltage divider is connected and between the third negative input end 27 and the branch in which the voltage divider is connected, so as to connect the voltage divider 14 in the branch in series.

Correspondingly, as shown in FIG. 5, connection points 28 corresponding to the second positive input end 21, the second negative input end 22, the third positive input end 26, and the third negative input end 27 in the LED section, respectively, are provided in the voltage divider section 24. Here, the connection points 28 corresponding to the third positive input end 26 and the third negative input end 27 are connected to the voltage divider 14 via leads 25. In practical production, the second positive input end 21, the second negative input end 22, the third positive input end 26, and the third negative input end 27 may be connected to the corresponding connection points 28 by means of welding so as to connect the voltage divider in the branch in series. It should be noted that, the LED section 23 shown in FIG. 2 covers the area where the connection points 28 (refer to FIG. 5) in FIG. 4 are located, the LED section shown in FIG. 3 is an extending part of the LED circuit 10, and the LED circuit 10 corresponds to the part other than the voltage divider 14 of the light-emitting component shown in FIG. 1.

It can be understood that, the backlight module is generally connected to the external power supply which is used for supplying voltage, but the voltage provided by the external power supply is generally different from the working voltage of the light-emitting component. In order to enable the light-emitting component operate normally, the backlight module may further comprise a driving unit, which is connected between the light-emitting component and the external power supply and used for converting the voltage provided by the external power supply into the working voltage of the light-emitting component.

The light-emitting component for a backlight module and the backlight module provided by the present invention are described above. It can be seen that, in the case that different numbers of LEDs are connected in the plurality of branches, according to the present invention, a voltage divider is connected in series in a branch with smaller number of LEDs so that the currents in respective branches become identical. In this way, the numbers of LEDs connected in series in respective branches may not be exactly the same, any number of LEDs may be provided in each of the branches, and further the safe distance between the adjacent lighting-emitting diodes is ensured and product quality is improved while the number of the lighting-emitting diodes is increased.

As still another aspect of the present invention, a liquid crystal display device is provided, which comprises the above-described backlight module provided by the present invention.

The liquid crystal display device further comprises a liquid crystal display panel, and the backlight module provides light for displaying of the liquid crystal panel. As any number of LEDs can be provided in the backlight module, the liquid crystal panel has more uniform brightness and improved display quality.

It can be understood that, the above implementations are merely exemplary implementations used for explaining the principle of the present invention, but the present invention is not limited thereto. For those skilled in the art, various modifications and improvements nay be made without departing from the spirit and essence of the present invention, and these modifications and improvements are deemed as the protection scope of the present invention.

The invention claimed is:

1. A light-emitting component for a backlight module, comprising a first positive input end, a first negative input end and a plurality of branches connected in parallel between the first positive input end and the first negative input end, each of the plurality of the branches comprising a plurality of light-emitting diodes connected in series, wherein, the numbers of light-emitting diodes in the respective branches are not exactly the same, a voltage divider is connected in series in at least one of the plurality of branches so that currents flowing through respective branches are the same, and wherein the voltage divider is connected in series in each branch except the branch with the largest number of LEDs among all of the plurality of branches so that any number of LEDs are allowed to be connected in series in each of the plurality of branches, wherein, the number of light-emitting diodes connected in series in one of the plurality of the branches is smaller than a preset number, the numbers of light-emitting diodes connected in series in the remaining branches of the plurality of branches are equal to the preset number, the preset number being the maximum number of LEDs allowed to be connected in series in each of the branches when the light-emitting component operates normally, and the voltage divider is connected in series in the one branch in which the number of light-emitting diodes is smaller than the preset number.

2. The light-emitting component according to claim 1, wherein, the number of light-emitting diodes in each of the plurality of the branches is not larger than 10.

3. The light-emitting component according to claim 1, wherein, the voltage divider comprises a variable resistor.

4. A backlight module, comprising a light-emitting component and a substrate on which a second positive input end and a second negative input end are provided, wherein, the light-emitting component is the light-emitting component according to claim 1, the second positive input end of the substrate is connected to the first positive input end of the light-emitting component, and the second negative input end of the substrate is connected to the first negative input end of the light-emitting component.

5. The backlight module according to claim 4, wherein, the substrate comprises a light-emitting diode section and a voltage divider section, the second positive input end, the second negative input end and the light-emitting diodes of the light-emitting component are provided in the light-emitting diode section, the voltage divider of the light-emitting component is provided in the voltage divider section, and leads are provided between the voltage divider of the light-emitting component and the branch in which the voltage divider is connected in series.

6. The backlight module according to claim 5, wherein, a third positive input end connected to an input end of the voltage divider of the light-emitting component and a third negative input end connected to an output end of the voltage divider of the light-emitting component are further provided in the light-emitting diode section.

7. The backlight module according to claim 4, further comprising a driving unit, which is connected between the light-emitting component and an external power supply and used to convert a voltage provided by the external power supply into a working voltage of the light-emitting component.

8. The backlight module according to claim 5, further comprising a driving unit, which is connected between the light-emitting component and an external power supply and used to convert a voltage provided by the external power supply into a working voltage of the light-emitting component.

9. The backlight module according to claim 6, further comprising a driving unit, which is connected between the light-emitting component and an external power supply and used to convert a voltage provided by the external power supply into a working voltage of the light-emitting component.

10. A liquid crystal display device, comprising the backlight module according to claim 4.

11. The liquid crystal display device according to claim 10, wherein, the substrate comprises a light-emitting diode section and a voltage divider section, the second positive input end, the second negative input end and the light-emitting diodes of the light-emitting component are provided in the light-emitting diode section, the voltage divider of the light-emitting component is provided in the voltage divider section, and leads are provided between the voltage divider of the light-emitting component and the branch in which the voltage divider is connected in series.

12. The liquid crystal display device according to claim 11, a third positive input end connected to an input end of the voltage divider of the light-emitting component and a third negative input end connected to an output end of the voltage divider of the light-emitting component are provided in the light-emitting diode section.

13. The liquid crystal display device according to claim 10, further comprising a driving unit, which is connected between the light-emitting component and an external power supply and used to convert a voltage provided by the external power supply into a working voltage of the light-emitting component.

* * * * *